US012753004B2

(12) United States Patent
Marks et al.

(10) Patent No.: US 12,753,004 B2
(45) Date of Patent: Oct. 6, 2026

(54) FOOD WASTE MANAGEMENT SYSTEM

(71) Applicant: SharkNinja Operating LLC, Needham, MA (US)

(72) Inventors: Travis Marks, East Boston, MA (US); Eleanor Anne Saunders, Cambridge (GB); James Richard Potter, Windsor (GB); Joshua Thomas Richards, Hassocks (GB)

(73) Assignee: SharkNinja Operating LLC, Needham, MA (US)

( * ) Notice: Subject to any disclaimer, the term of this patent is extended or adjusted under 35 U.S.C. 154(b) by 335 days.

(21) Appl. No.: 18/495,129

(22) Filed: Oct. 26, 2023

(65) Prior Publication Data

US 2025/0136365 A1 May 1, 2025

(51) Int. Cl.

| | |
|---|---|
| ***B65F 1/14*** | (2006.01) |
| ***B01D 39/20*** | (2006.01) |
| ***B01D 46/00*** | (2022.01) |
| ***B65F 1/02*** | (2006.01) |
| ***B65F 1/16*** | (2006.01) |

(52) U.S. Cl.

CPC ........ *B65F 1/1452* (2013.01); *B01D 39/2055* (2013.01); *B01D 46/0038* (2013.01); *B65F 1/02* (2013.01); *B65F 1/16* (2013.01); *B65F 2210/129* (2013.01); *B65F 2210/137* (2013.01)

(58) Field of Classification Search

None

See application file for complete search history.

(56) References Cited

U.S. PATENT DOCUMENTS

| | | | | |
|---|---|---|---|---|
| 5,925,321 | A * | 7/1999 | Koyamoto | B01D 53/86 422/177 |
| 10,898,604 | B2 * | 1/2021 | Benedek | A61L 2/10 |
| 11,406,935 | B1 * | 8/2022 | Lapin | B01D 53/78 |
| 12,331,000 | B2 * | 6/2025 | Gao | C05F 17/907 |
| 12,383,909 | B2 * | 8/2025 | Hwang | B02C 18/12 |
| 12,458,976 | B2 * | 11/2025 | Kim | B02C 18/2216 |
| 12,472,507 | B2 * | 11/2025 | Rogers | B02C 18/0084 |
| 12,496,588 | B2 * | 12/2025 | Jin | B02C 18/0092 |
| 12,505,567 | B2 * | 12/2025 | Yurimoto | A01K 29/005 |
| 2002/0092853 | A1 | 7/2002 | Wang | |
| 2008/0289213 | A1 | 11/2008 | Lee | |

(Continued)

FOREIGN PATENT DOCUMENTS

| | | |
|---|---|---|
| CN | 107954124 A | 4/2018 |
| CN | 217946370 U | 12/2022 |

(Continued)

OTHER PUBLICATIONS

International Search Report and Written Opinion on PCT Appl. No. PCT/US2024/052042 dated Feb. 5, 2025 (13 pages).

(Continued)

*Primary Examiner* — Brit E. Anbacht
(74) *Attorney, Agent, or Firm* — Foley & Lardner LLP

(57) ABSTRACT

A device for odor neutralization of food waste includes a chamber to receive food waste, the chamber having an inlet and an outlet, an odor neutralizer coupled with the inlet via a first flow path, the odor neutralizer to output particles to mitigate odor emitted from the food waste, and a filter coupled with the outlet via a second flow path to filter remaining odor in the second flow path.

5 Claims, 11 Drawing Sheets

(56) References Cited

U.S. PATENT DOCUMENTS

| | | | | |
|---|---|---|---|---|
| 2011/0155117 | A1 | 6/2011 | Kim et al. | |
| 2012/0039757 | A1 | 2/2012 | Yoo et al. | |
| 2022/0001389 | A1* | 1/2022 | Maxwell | B02C 18/0092 |
| 2022/0242799 | A1* | 8/2022 | Ying | B01D 46/0038 |
| 2023/0001422 | A1 | 1/2023 | Hwang et al. | |
| 2023/0081670 | A1* | 3/2023 | Rogers | B09B 3/35 241/65 |
| 2023/0125117 | A1 | 4/2023 | Lee | |
| 2023/0129640 | A1 | 4/2023 | Khan et al. | |
| 2023/0415098 | A1* | 12/2023 | Johnson | B01D 53/73 |
| 2024/0009677 | A1* | 1/2024 | Jin | B02C 18/0092 |
| 2025/0019317 | A1* | 1/2025 | Gao | C05F 17/907 |

FOREIGN PATENT DOCUMENTS

| | | | | | |
|---|---|---|---|---|---|
| CN | 118666601 | A | * | 9/2024 | C05F 17/971 |
| KR | 20080014121 | A | | 2/2008 | |
| KR | 20-0439976 | Y1 | | 5/2008 | |
| KR | 20090079453 | A | | 7/2009 | |
| KR | 10-2009-0123407 | A | | 12/2009 | |
| WO | WO-2005002995 | A1 | * | 1/2005 | B65F 7/00 |
| WO | WO-2022/014789 | A1 | | 1/2022 | |

OTHER PUBLICATIONS

Non-Final Office Action on U.S. Appl. No. 18/495,147 dated Mar. 19, 2025 (10 pages).

Non-Final Office Action on U.S. Appl. No. 18/495,158 DTD Feb. 9, 2026.

* cited by examiner

FOOD WASTE MANAGEMENT SYSTEM

BACKGROUND

Biodegradable waste, such as food scraps, can be separated from non-biodegradable waste during the waste disposal process. Individuals can maintain separate waste receptacles for both biodegradable waste and non-biodegradable waste. Waste receptacles used to store biodegradable waste can produce malodorous particles because of decomposing waste.

SUMMARY

Systems and methods in accordance with the present disclosure can facilitate odor neutralization of food waste, such as to reduce an amount of malodorous particles outputted from a housing (e.g., caddy) that stores food waste and/or facilitate the use of the housing for food waste storage and disposal. For example, the system can include the housing and a base that supports the housing. The housing can form an enclosed chamber that can receive food waste when a lid of the housing is opened. The housing can have one or more ports that connect with one or more ports of the base to allow for air flow into the chamber from the base and air flow out of the chamber into the base (e.g., to be exhausted from the base). The base can include odor neutralization, mechanical, and/or electrical components that drive the air flow and interact with the air that is driven into the chamber and out of the chamber. For example, the base can include an odor neutralizing puck that releases fragrant and/or odor neutralizing particles into the air flow in order to mitigate (foul) odors from the food waste in the chamber. The base can include a fan that draws air into the base, including to draw the fragrant and/or odor neutralizing particles into the air, and cause the air to flow in a (first) flow path out of the base and into the housing (e.g., into the chamber via the lid), and out of the housing back out through the base (e.g., via a second flow path back out of the chamber through the lid and through the base to an exhaust port of the base). The base can include a heater that heats the air flow that is provided into the chamber to dry the food waste, which can facilitate reducing odors from the food waste. The base can include a filter (e.g., between where the air flow is received back from the chamber and the exhaust port) to filter at least a portion of remaining odor particles from the air flow to be exhausted. The odor neutralizer and the filter can operate as an ordered, two-stage odor neutralization system to more effectively neutralize odor from the food waste. The housing can be removably coupled with the base so that the housing can be easily transported to a location for disposing the food waste after storage (e.g., without needing to transport the base and the components of the base). The flow paths through the base and housing can be arranged to control where air flow is outputted from the system, such as to direct exhaust air flow out from the bottom or near the bottom of the base to reduce or minimize a perceived effect of any odor remaining in the exhausted air flow.

At least one aspect relates to a device for odor neutralization of food waste. The device includes a chamber to receive food waste, the chamber having an inlet and an outlet, an odor neutralizer coupled with the inlet via a first flow path, the odor neutralizer to output particles to mitigate odor emitted from the food waste, and a filter coupled with the outlet via a second flow path to filter remaining odor in the second flow path.

At least one aspect relates to a system for food waste odor neutralization. The system includes an odor neutralizer coupled with a first port of a chamber for receiving food waste, a filter coupled with a second port of the chamber, and a fan to cause air to flow over the odor neutralizer, through the first port into the chamber, out of the chamber through the second port, and through the filter.

At least one aspect relates to an apparatus. The apparatus includes a first housing forming a chamber, and a lid movably coupled with the first housing to allow access into the chamber for depositing food waste in the chamber. The lid includes at least one first port coupled with the chamber and a first channel in the first housing, and at least one second port coupled with the chamber and a second channel in the first housing. The apparatus further includes a second housing with which the first housing is removably coupled, an odor neutralizer in a third channel of the second housing, the third channel coupled with the first channel, and a filter in a fourth channel of the second housing, the fourth channel coupled with the second channel.

DETAILED DESCRIPTION

Figure 1:
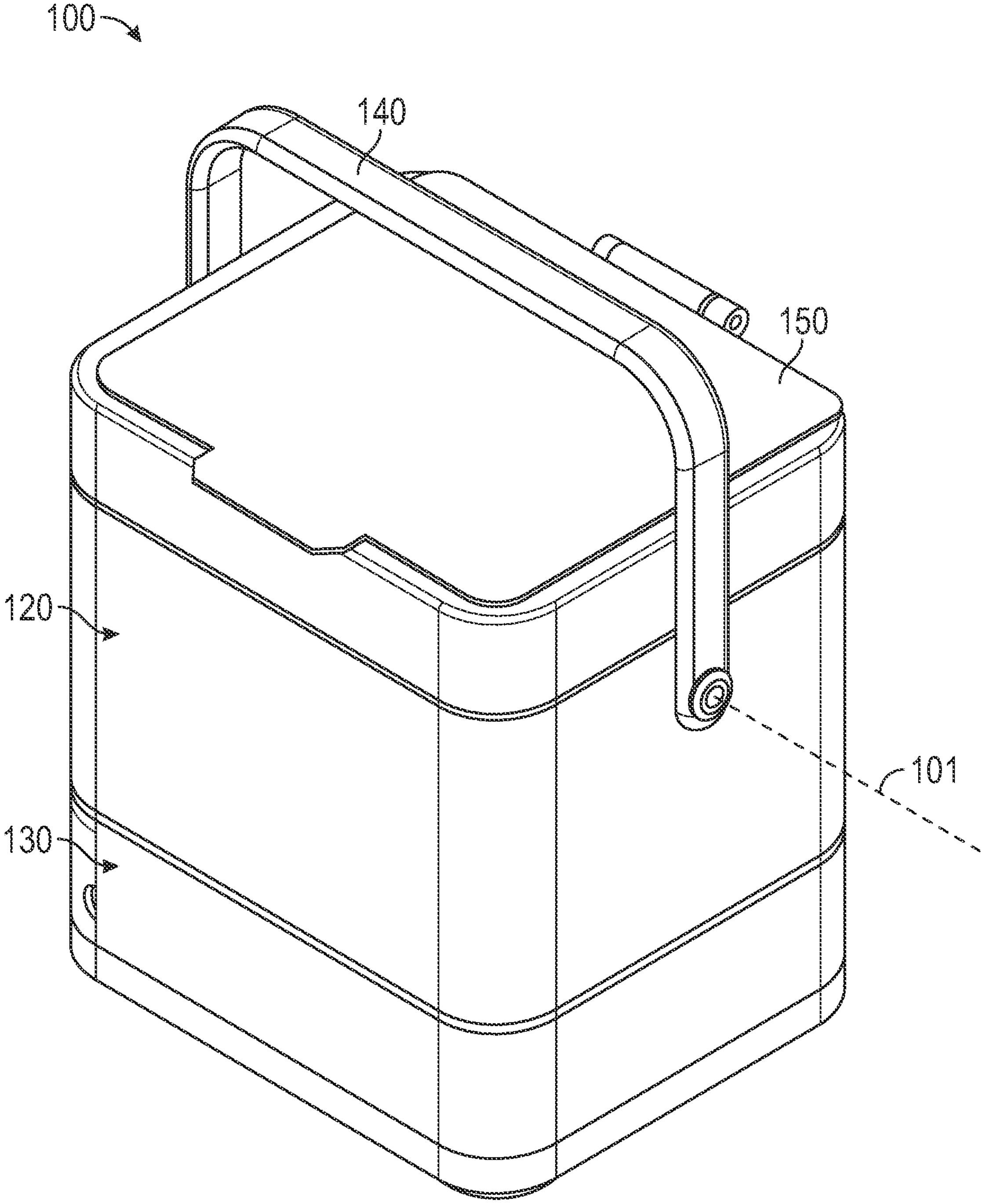
FIG. 1 is a perspective view of a waste management system, according to an example implementation.

Following below are more detailed descriptions of various concepts related to, and implementations of, methods, apparatuses, and systems of a food waste management system. The various concepts introduced above and discussed in greater detail below can be implemented in any of numerous ways.

Waste management systems can receive and store food materials, including food wastes. It can be useful to store these materials for later disposal, such as disposal according to a schedule or with a particular waste removal product or service. In some instances, it can be useful to compost and/or prepare food materials for compositing, though various systems may not necessarily be designed to achieving composting.

However, storing food materials can result in release of malodorous particles and/or foul odors. For example, while stored, food materials may undergo decomposition or other biological or chemical processes that can lead to malodorous particles being released. These malodorous particles can be released into an environment around the device that stores the food, degrading the experience of using the device. In addition, when transporting the food waste (in the device or in a bag or other container of the device) for transfer to an outdoor disposal unit, users may have to open a housing in which the food waste is stored or otherwise be more directly exposed to or in contact with the food waste.

Some devices incorporate complex components to manage the odors and other issues associated with food waste storage. However, such components can have high size, weight, and/or power (SWAP) requirements. For example, such components can include high temperature heaters, cooling systems, and pumps, which can be heavy, noisy during operation, require frequent or continuous operation, and/or require significant power usage, limiting the quality of the experience of using such devices.

Systems, devices, and methods in accordance with the present disclosure can enable storage of food materials in a manner that reduces or otherwise mitigates release of malodorous particles into an environment around where the food waste is stored, while also reducing or otherwise mitigating the need for complex/high SWAP components. For example, the device can be structured to have specifically arranged, distinct flow paths into and out of a chamber in which food is stored so that any malodorous particles are directed out of the bottom of the device, rather than through other exit paths that can more directly enter the environment around the device. The device can be structured in a modular manner, such as to include separate housings for (1) the chamber and (2) air flow, filtering, and/or heating components, which can facilitate transferring the food material to another unit (e.g., outdoor storage unit for pickup by a waste removal service). The device can have specific components for treating the malodorous particles released by the food material to reduce or otherwise mitigate the effect of these particles outside of the device and/or while the chamber is opened to remove the food material from the chamber; for example, the device can include an odor neutralizer upstream of the chamber to incorporate fragrant and/or odor-binding particles into air flow into the chamber, a heater upstream of the chamber to heat the air flow into the chamber to dry the food material, and/or a filter downstream of the chamber to further filter remaining odors before being outputted from the device. By incorporating various such structures and/or components into the device, the device can allow for more effective storage and handling of food materials and/or food waste.

For example, a waste management device and/or system can include a chamber for receiving and temporarily storing food materials and/or waste (e.g., biodegradable waste, food scraps, food byproducts, organic material, plant clippings, etc.). The waste management system can be used indoors and includes several features to reduce the overall odor associated with waste management system. For example, an individual or multiple individuals can use the waste management system to dispose of biodegradable waste. The biodegradable waste can be periodically emptied from the waste management system. For example, a waste disposal company can periodically retrieve biodegradable waste from an individual's home. In this example, the waste management system can be utilized to temporarily store the waste in between retrievals.

According to various implementations, the chamber is defined by (e.g., formed by one or more walls of) a first housing that is removable from the remainder of the waste management system. For example, first housing can be removably coupled to a second housing such that the waste stored in the chamber can be transported within the first housing without the need to transport the second housing.

According to various implementations, the second housing has (e.g., houses) one or more electronic components. For example, the second housing can have a fan, (e.g., a blower, fan, air moving device, etc.), for directing airflow within the waste management system. For example, the fan can cause ambient air to be drawn into the waste management system, directed into the chamber, and subsequently out an exhaust of the waste management system. Further, the second housing can have a heater, such as a resistive heating element. The heater can cause air within the waste management system to be heated to an elevated temperature (e.g., greater than ambient temperature). For example, the fan can cause air to be blown over the heater and subsequently into the chamber. The heated air can facilitate drying of the waste within the chamber, which can reduce odor associated with the waste management system. Additionally, drying of the waste can reduce a volume and/or a mass of the waste such that additional waste can be added to the chamber and/or the first housing can more easily be manipulated for disposal of the waste. According to various implementations, the second housing has a power supply and a controller to control at least one of the fan or the heater. Further, the second housing can have one or more sensors (e.g., temperature sensors, airflow sensors, weight sensors, humidity sensors, etc.) such that the controller can adjust control of one or more devices (e.g., the fan, the heater, etc.) based on data received from the one or more sensors. In some implementations, the waste management system does not have sensors (or has a reduced set of sensors), and the controller can control the one or more electronic devices according to predetermined control schemes and/or user inputs indicative of a type of material in the chamber, which can be used to select the control scheme to implement.

According to various implementations, the second housing has an odor neutralizer. The ambient air drawn into the second housing can be exposed to the odor neutralizer before the air enters the chamber. For example, the odor neutralizer can release one or more fragrances (e.g., particles having fragrance characteristics) and/or one or more odor neutralizing compounds into air such that the air entering the chamber contains the one or more fragrances and/or the one or more odor neutralizing compounds. According to various implementations, treating the air before the air is provided within the chamber can reduce odor associated with the waste management system. The odor neutralizer can include and/or be received in an adjustment member to enable the odor neutralizer to be transitioned between a plurality of user-selectable positions to vary an amount of fragrance particles output by the odor control assembly during use of the waste management system.

According to various implementations, the first housing includes one or more ports, such as an inlet, exhaust. For example, the inlet and exhaust can both be at least partially positioned within the lid to reduce overall size of the waste management system. The inlet and the exhaust can be isolated from one another to reduce mixing of inlet air and exhaust within the waste management system.

According to various implementations, the air exiting the chamber is directed towards an air filter (e.g., housed within the second housing). The air filter can reduce the odor of the exhaust air to reduce odor associated with air released from the waste management system. According to various implementations, the exhaust is released from a bottom portion of the second housing such that the exhaust is not directed upwards towards a user of the waste management system and/or more extensively into an environment around the waste management system.

According to various implementations, the device includes a first housing forming the chamber and a second housing removably coupled with the first housing. The odor neutralizer, the filter, the first flow path, and the second flow path can be located within the second housing. Further, the first flow path is separated from the second flow path. According to various implementations, any components that are not designed to be exposed to water are positioned within the second housing. Thus, the first housing can be submerged during cleaning of the first housing.

According to various implementations, a lid is movably coupled with the first housing to allow access for depositing the food waste in the chamber. According to various implementations, the inlet and the outlet are formed in the lid. According to various implementations, the first housing is positioned above the second housing in a use mode of the device.

According to another example implementation, a system for food waste odor neutralization includes the odor neutralizer coupled with a first port of the chamber for receiving food waste. The system further includes the filter coupled with a second port of the chamber. Further, the system includes the fan that can cause air to flow over the odor neutralizer, through the first port into the chamber, out of the chamber through the second port, and through the filter, thereby resulting in a two-stage odor mitigation system.

According to various implementations, the controller includes one or more processors that can control operation of the fan based on one or more parameters. For example, a speed of the fan can be controlled based at least on a food type parameter associated with the food waste. The food type parameter can correspond with a moisture level associated with the food waste. For example, if the food waste has a relatively high moisture level, as indicated by the food type parameter, the fan can operate at a higher speed to facilitate drying of the food waste. The food type parameter can be input by a user (e.g., via a device in communication with the controller, via a user input located on the system for food waste odor neuralization, etc.). The food type parameter can be determined based on data from one or more sensors (e.g., humidity sensors, weight sensors, etc.) positioned within the system.

According to various implementations, the controller can control the heater. For example, the heater be controlled based at least on a food type parameter associated with the food waste. The food type parameter can correspond with a moisture level associated with the food waste. For example, if the food waste has a relatively high moisture level, as indicated by the food type parameter, the heater can generate more heat to facilitate drying of the food waste.

According to various implementations, the waste management system includes a handle rotatably coupled with the first housing. The handle can have a range of motion extending beyond the lid such that the handle can be rotated away from the lid to open the lid.

According to various implementations, the waste management system a receiver on an exterior of the second housing. The receiver can selectively receive the odor neutralizer such that the odor neutralizer can be removed and replaced as desired.

According to various implementations, an air outlet or a vent is on at least one of a side surface or a bottom surface of the second housing such that exhaust released from the apparatus is not directed upwards (e.g., towards a user of the apparatus). According to various implementations, the filter is provided in one or more output channels between the first housing and the vent.

According to various implementations, the first housing includes a port connecting the one or more input channels with the chamber and a port connecting the one or more output channels with the chamber. The chamber can be free of openings below the first port and the second port.

According to various implementations, at least one wall separating the chamber from the one or more input channels. According to various implementations, the apparatus includes an odor neutralizer coupled with the one or more input channels and a fan in the one or more input channels between the odor neutralizer and the chamber, the fan to direct particles emitted by the odor neutralizer into the chamber via the one or more input channels.

According to various implementations, the apparatus includes a lid coupled with the first housing to allow access for depositing the food waste in the chamber. At least a portion of the one or more input channels and the one or more output channels can extend into the lid. The lid can include a lid base forming the portion of the one or more input channels and the one or more output channels extending in the lid and a lid cover extending over the lid base to cover the portion.

According to another example implementation, the system includes a first channel extending between a first port in the base and a second port coupled with the chamber and a second channel extending between a third port coupled with the chamber and a fourth port in the base. Further, the system includes a fan in the base to cause air to flow through the chamber.

According to an example implementation, the housing is removably mounted on the base such that the housing can be transported without the need to move the base. According to an example implementation, the system includes a filter in the base coupled with the second channel. The fan can cause air to flow into the first channel via the first port, from the first channel into the chamber via the second port, out of the chamber into the second channel via the third port, and out of the base via the fourth port.

According to an example implementation, the heater in the base is located between the first port and the second port. The heater can operate at a temperature between 90 degrees Fahrenheit and 120 degrees Fahrenheit or heat air in the first channel to between 90 degrees Fahrenheit and 120 degrees Fahrenheit. The heater can facilitate drying the food waste by heating the air before the air is provided within the chamber.

According to an example implementation, the housing has a height greater than a height of the base. According to an example implementation, the second port and the third port are adjacent to a top half of the chamber, and the chamber is free of openings below the second port and the third port. According to an example implementation, the system includes a lid movably coupled with the housing to allow access for depositing the food material in the chamber, wherein the second port and the third port are formed in the lid.

According to another example implementation, the housing includes a third flow path and a fourth flow path each separated from the chamber by at least one wall of the chamber, the third flow path coupled with the first flow path and a first port of the housing facing the chamber, the fourth flow path coupled with the second flow path and a second port of the housing facing the chamber.

According to another example implementation, the first housing is removably coupled with the second housing such that removal of the first housing from the second housing decouples the at least first port from the at least second port.

According to an example implementation, the second housing includes a flow path extending between a third port and a receiver. The receiver can be at least partially open to an exterior of the second housing. An odor neutralizer can be positioned within the receiver. According to an example implementation, the system includes a fan in a first flow path in the second housing coupled with the third port, a heater in the first flow path between the fan and the third port, and a filter in a second flow path in the second housing coupled with the fourth port. According to an example implementation, a first perimeter of the first housing is within ten percent of a second perimeter of the second housing.

Referring now to FIG. 1, a perspective view of a waste management system 100 is shown, according to an example implementation. The waste management system 100 can store food material or waste (e.g., biodegradable waste, food scraps, food byproducts, organic material, plant clippings, etc.). Further, the waste management system 100 can reduce moisture of the waste stored within the waste management system 100. By reducing the moisture of the waste, odors produced by the waste can be reduced and/or the mass and/or volume of the waste can be reduced. The waste management system 100 can include a two-stage odor mitigation system that can reduce odors produced by the waste.

The waste management system 100 includes an upper housing 120 (e.g., first portion, first housing, first assembly, etc.) and a base 130 (e.g., lower housing, second portion, second housing, second assembly, etc.). The upper housing 120 is removably coupled to the base 130. For example, a user of the waste management system 100 can lift the upper housing 120 away from the base 130 using a handle 140 coupled to the upper housing 120, as is discussed further below with respect to FIG. 2. The handle 140 can be rotatably coupled with the upper housing 120 such that the handle 140 can rotate about axis 101. The handle can have a range of motion (e.g., a first position about the axis 101 and a second position about the axis 101 on an opposite side of the upper housing 120 from the first position) extending beyond a lid 150 coupled to the upper housing 110. Therefore, the handle 140 can be rotated away from the lid 150 such that a user can open the lid 150. The handle 140 can be sized relative to the upper housing 120 so that the handle 140 can be rotated from the first position to the second position (or vice versa) around the lid 150, while contact with the handle 140 and the upper housing 120 can limit further rotation.

Figure 2:
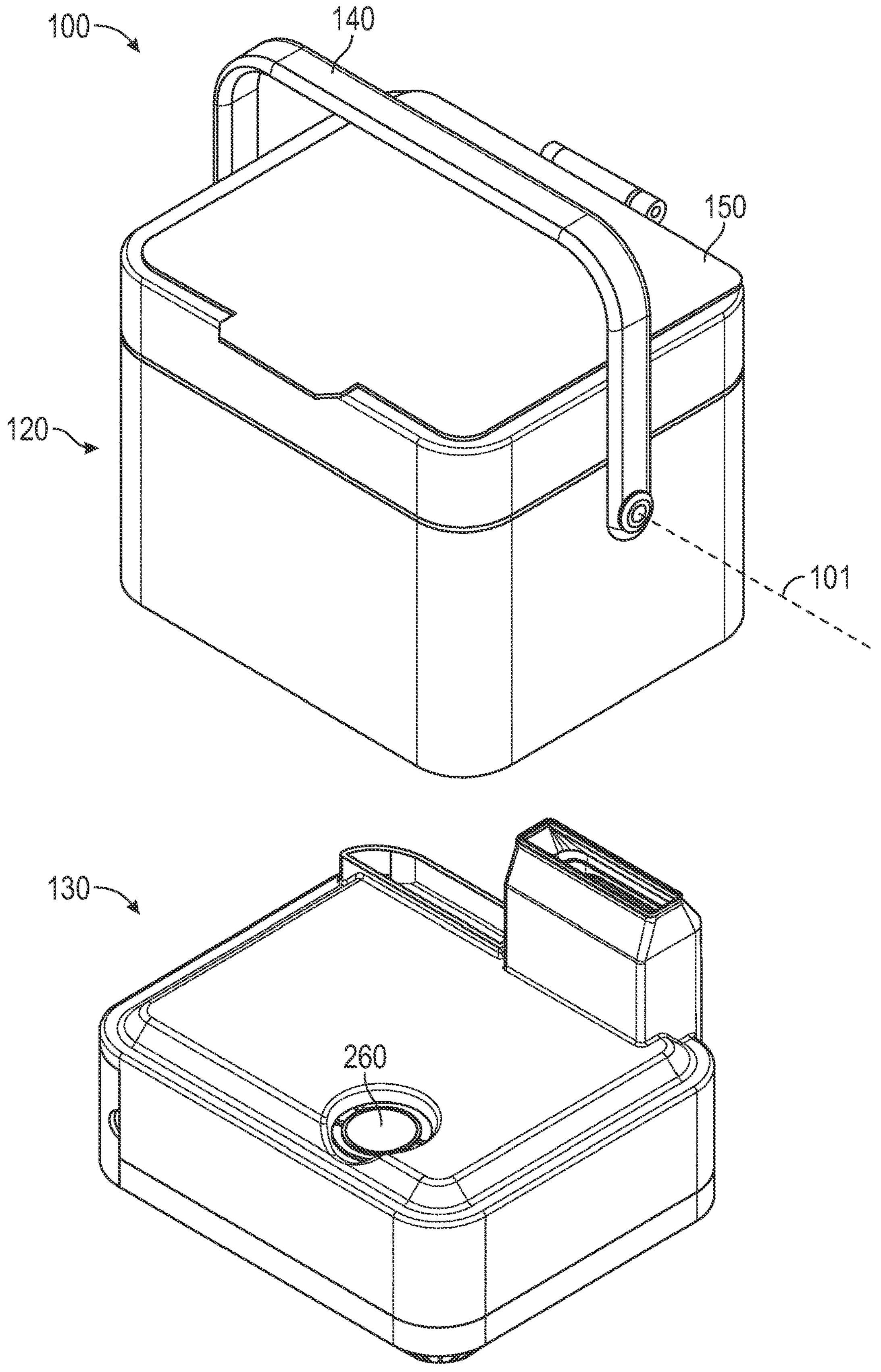
FIG. 2 is a perspective view of an upper housing separated from a base of the waste management system of FIG. 1.

Referring now to FIG. 2, a perspective view of the waste management system 100 including the upper housing 120 separated from the base 130 is shown. As discussed further herein, a user can lift the handle 140 of the upper housing 120 to separate the upper housing 120 from the base 130. According to various implementations, the upper housing 120 can store the waste. Thus, a user can separate the upper housing 120 from the base 130 to transport (e.g., dispose of) the waste to a desired location without the need to transport the base 130. Further, as shown, the lid 150 can remain closed (e.g., as shown in FIG. 2) as the upper housing 120 is separated from the base 130, which can reduce the odor released from the upper housing 120 and the upper housing 120 is transported.

Further, the weight of the upper housing 120 can be reduced by including various components in the base 130. As discussed further herein, one or more electrically powered components can be housed within the base 130. Since a user of the waste management system 100 may only need to transport the upper housing 120 to dispose of the waste, the user need not to transport the electrical components to dispose of the waste, thereby reducing the load needed to be carried by the user. Where the upper housing 120 does not include any water sensitive components (e.g., electrically powered components, air filters, odor mitigation devices, etc.), for example, the upper housing 120 can be cleaned separately from the 130. For example, the upper housing 120 can be submerged in water or a cleaning solution during a cleaning process without water coming into contact with any of the water sensitive components of the waste management system 100.

As shown in FIG. 2, the waste management system 100 includes an odor neutralizer 260 coupled to the base 130. The odor neutralizer 260 can output particles to mitigate odor emitted from the food waste. The one or more particles can include at least one of a fragrance characteristic or an odor neutralizing characteristic. For example, the one or more particles can have a fragrance characteristic corresponding to a smell that is fragrant or otherwise desirable for a user to perceive. The one or more particles can have an odor neutralizing characteristic corresponding to the ability of the one or more particles to reduce the effect of malodorous particles, such as by binding with malodorous particles.

The odor neutralizer 260 can be received within a receiver (e.g., receiver 1102 described with respect to FIG. 11) of the base 130 and can be removed, for example, to dispose of a used odor neutralizer 260 and insert a new odor neutralizer 260. As discussed further herein, a portion of the odor neutralizer 260 extends within the base 130. For example, the odor neutralizer 260 can be at least partially positioned within a first flow path located between an air inlet and a first base channel that directs air into the upper housing 120. Therefore, the odor neutralizer 260 can release particles to mitigate odor into air before the air is provided into the upper housing 120.

Figure 3:
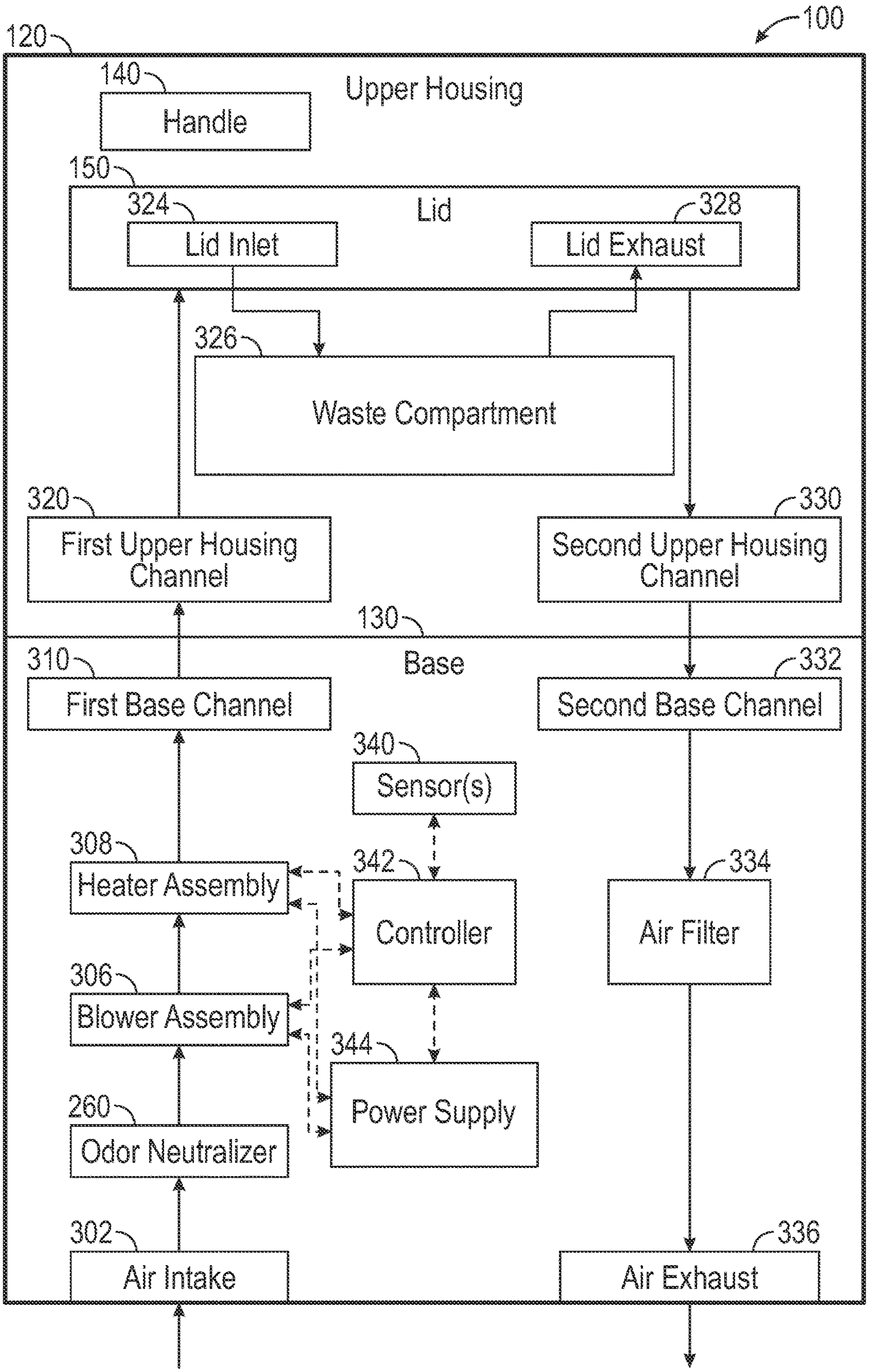
FIG. 3 is a schematic diagram of the waste management system of FIG. 1.

Referring now to FIG. 3, a schematic diagram of the waste management system 100 is shown. The waste management system 100 can draw air into the base 130 via an air intake 302, circulate the air through the waste management system 100 to dry out the waste and/or mitigate odors associated with waste, and release the air through an air exhaust 336.

The waste management system 100 includes the air intake 302. According to various implementations, the air intake 302 is located proximate a bottom of the base 130. For example, the air intake 302 can be located on a bottom surface (e.g., opposite an upper surface that faces the upper housing 120) of the base 130. The air intake 302 can be located on a side surface of the base 130 such that the air intake 302 is closer to the bottom surface that then upper surface. The air intake 302 can be defined by a plurality of openings or perforations in an outer shell of the base 130. According to various implementations, a fan, or a fan 306, causes the air to be drawn into the air intake 302 from the surrounding environment.

After passing through the air intake 302, the air can be exposed to the odor neutralizer 260. The odor neutralizer 260 can output particles into the air to mitigate odor emitted from the food waste. As noted above, the one or more particles can include at least one of a fragrance characteristic or an odor neutralizing characteristic. According to various implementations, the odor neutralizer 260 is positioned within a cavity (e.g., cavity 1102 in FIG. 11) in fluid communication with the air intake 302. Air can be drawn into the cavity via the air intake 302 and the odor neutralizer 260 can output particles within the cavity such that the particles are mixed with the air in the cavity prior to the air being directed towards the upper housing 120.

According to various implementations, the odor neutralizer 260 includes a fragrance member, such as a puck-shaped member that includes or is formed from the particles having the at least one of the fragrance characteristic or the odor neutralizing characteristic. The particles can be provided by the fragrance member. The fragrance member can be coupled to and adjustment member. The adjustment member can adjust the rate at which the particles are released from the odor neutralizer. For example, the fragrance member can be contained within a housing of the odor neutralizer 260. A width of an opening in the housing of the odor neutralizer 260 can be adjustable via the adjustment member based on a plurality of user-selectable positions to adjust the rate at which particles are released from the odor neutralizer. For example, if a user experiences odors being released from the waste management system 100 or anticipates waste to create a surplus of odors, the user can adjust the adjustment member thereby releasing a larger number of particles into the air flowing into the upper housing 120 to reduce the odor released from the waste management system 100.

The waste management system 100 can include the fan 306 positioned within the base 130. The fan 306 can include one or more devices to direct airflow through the waste management system 100. For example, the fan 306 can include on or more fans coupled to a power supply 344 to cause the one or more fans to rotate to direct airflow through the waste management system 100.

The fan 306 can be fluidly coupled with the odor neutralizer 260 and/or a channel facing the odor neutralizer 260. For example, the fan 306 can be positioned within the same cavity as the odor neutralizer 260. For example, the fan 306 can cause air to flow out of the cavity (e.g., into a heater 308). The pressure difference created by the fan 306 within the cavity can cause air to be drawn into the cavity via the air intake 302.

The waste management system 100 can include a heater 308. The heater 308 can heat air received via the air intake 302 prior to the air being directed to the upper housing 120. For example, the heater 308 can include one or more heating elements positioned within a heating cavity. The fan 306 can direct air into the heating cavity such that the one or more heating elements heat the air to an elevated temperature.

The heating elements of the heater 308 can operate at a temperature between 90 degrees Fahrenheit and 120 degrees Fahrenheit, such as between about 100 degrees and about 110 degrees. The heater 308 can heat the air within the heating cavity and/or a first base channel 310 to a temperature between 90 degrees Fahrenheit and 120 degrees Fahrenheit. The heater can facilitate drying the food waste by heating the air before the air is provided within the chamber. According to various implementations, the heater 308 is optimized for drying of the food and operates below an optimal decomposition temperature and/or below a sanitation temperature.

The heater 308 and/or the blower assembly 306 can be coupled to a power supply 344. The power supply 344 can provide power to the heater 308 and/or the blower assembly 306. The power supply 344 can include a plug-in power supply. The power supply 344 can include a battery such that the waste management system 100 does not need to be plugged in to operate.

The heater 308 and/or the blower assembly 306 can be coupled to a controller 342. The controller 342 can control operation of the heater 308 and/or the blower assembly 306. The controller 342 can control the heater 308 and/or the blower assembly 306 based on a predetermined schedule. Further, the controller 342 can control the heater 308 and/or the blower assembly 306 based on a user input. For example, the controller 342 can be communicate with an external user device (e.g., phone, laptop, tablet, etc.) such that the user can control the waste management system 100 via the user device. The waste management system 100 can include a user input device (e.g., one or more switches, one or more buttons, a touch screen display, etc.) that allows the user to control the waste management system 100 via the user input device.

The controller 342 can include one or more processors and a memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory (e.g., fuzzy logic, etc.) or received from other computer readable media (e.g., CDROM, network storage, a remote server, etc.) to perform one or more of the processes described herein. The memory may include one or more data storage devices (e.g., memory units, memory devices, computer-readable storage media, etc.) configured to store data, computer code, executable instructions, or other forms of computer-readable information. The memory may include random access memory (RAM), read-only memory (ROM), hard drive storage, temporary storage, non-volatile memory, flash memory, optical memory, or any other suitable memory for storing software objects and/or computer instructions. The controller 342 can be implemented as a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof. The memory may include database components, object code components, script components, or any other type of information structure for supporting the various activities and information structures described in the present disclosure. The memory may be communicably connected to the processor via the processing circuit and may include computer code for executing (e.g., by processor) one or more of the processes described herein. The memory can include various modules (e.g., circuits, engines) for completing processes described herein. The controller 342 can include and/or be coupled with one or more user interface devices and/or one or more network interface devices, such as to facilitate receiving or providing inputs and outputs for the controller 342.

The controller 342 can receive data from one or more sensors 340 (e.g., temperature sensors, airflow sensors, weight sensors, humidity sensors, etc.) included in the waste management system 100. The controller 342 can adjust control of the heater 308 and/or the blower assembly based on data received from the one or more sensors 340. For example, a temperature sensor can measure temperature of air entering the upper housing 120 and the controller 342 can adjust the heater 308 to achieve a desired temperature. In another example, a weight sensor can determine a weight of the waste in the upper housing. In this example, the controller 342 can increase the power provided to the blower assembly 306 and/or the heater 308 in response to a relatively large weight of waste being introduced into the upper housing 120, as measured by the weight sensor. In an example, a humidity or moisture sensor can be positioned within the waste management system 100 (e.g., within a second base channel 332). The controller 342 can adjust power supplied to the heater 308 and/or the blower assembly 306 based on data received from the humidity or moisture sensor. For example, the controller 342 can increase power supplied to the heater 308 and/or the blower assembly 306 in response to a humidity or moisture level being detected above a threshold value. In some implementations, the controller 342 operates according to a control scheme independent of sensor data (e.g., the waste management system 100 may not include any sensors); the control scheme can be predefined and/or responsive to user input.

The waste management system 100 can include the first base channel 310. The first base channel 310 can receive air from the heater 308 and direct the air into a first upper housing channel 320 defined by the upper housing 120. For example, the first base channel 310 may extend to a port 910 (see FIG. 9) configured to couple with a port 810 (see FIG. 8) included in the first upper housing channel 320.

As discussed further below, the first base channel 310 can include a projection extending upwards from the base 130. The projection can be at least partially received within the first upper housing channel 320, which can reduce the likelihood of the upper housing 120 being inadvertently separated from the base 130. For example, the interaction between the first upper housing channel 320 and the first base channel 310 can require the upper housing 120 to be lifted upwards away from the base 130 to separate the base 130 from the upper housing 120.

The waste management system 100 can include the lid 150. The lid 150 includes a lid inlet 324 to receive air from the first upper housing channel 320 (e.g., heated air including the particles from the odor neutralizer 260 received from the base 130). The lid inlet 324 can direct the air into a waste chamber 326 (e.g., compartment) defined by the upper housing 120. Thus, the lid inlet 324 can serve as an inlet or a port into the waste chamber 326. In some implementations, the air flow path between the air intake 302 and the waste chamber 326 define a first flow path. Further, the first flow path may be defined by the air flow path between the air intake 302 and the first base channel 310.

The air can then exit the waste chamber 326 via a lid exhaust 328. For example, the operation of the blower assembly 306 can drive the air into the waste chamber 326 from the lid inlet 324 and out of the waste chamber 326 from the lid exhaust 328. Thus, the lid exhaust 328 can serve as an outlet or a port out of the waste chamber. The lid exhaust 328 can surround a portion of the lid inlet 324, which can promote air circulation within the waste chamber 326.

As discussed further herein, the lid inlet 324 and the lid exhaust 328 (e.g., lid outlet) can both be integrated into the lid 150, which can reduce the overall size of the waste management system 100 and/or allow for a larger waste chamber 326. As described further with reference to FIG. 6, the lid inlet 324 and the lid exhaust 328 can be partitioned apart from one another within the lid 150 such that air within the lid inlet 324 does not mix with air within the lid exhaust 328. For example, for air to pass from the lid inlet 324 to the lid exhaust 328, the air must pass through the waste chamber 326. Such an arrangement can facilitate controlling airflow within the waste chamber 326 to improve operation of the waste management system 100, such as to ensure that the air leaving the waste chamber 326 is directed towards the air exhaust 336 after the air has been heated and the odor neutralizing effects of particles from the odor neutralizer 260 have been applied to the air.

chamber The waste chamber 326 can be accessed by opening the lid 150. As described further herein, the lid inlet 324 and the lid exhaust 238 can both be integrated into the lid 150. According to various implementations, when the lid 150 is closed, air can only enter and leave the waste chamber via the lid inlet 324 and the lid exhaust 328, which can reduce the odor released from the waste chamber 326 and into the surrounding environment.

The upper housing 120 can include a second upper housing channel 330 coupled with the lid exhaust 328. The second upper housing channel 330 can extend to and/or include a port), such as the port 820 depicted in FIG. 8. The port 820 can be coupled with the base 130 (e.g., with the port 920 shown in FIG. 9). The base 130 can include a second base channel 332, which can extend to and/or include the port 820. For example, after the air travels out of the waste chamber 326 via the lid exhaust 328, the air can be directed towards the second upper housing channel 330 and back into the base 130 via the second base channel 332.

The base 130 can include a filter 334 (e.g., air filter). The air filter 334 can include a carbon filter (e.g., carbon-based air filter), a high efficiency particulate air (HEPA) filter, a UV light filter, an electrostatic filter, a washable filter, a pleated filter, or any combination thereof. The filter 334 can filter the air driven out of the waste chamber 326. For example, the waste management system 100 can implement a two-stage odor mitigation process by using the odor neutralizer 260 to provide particles having fragrant and/or odor neutralizing characteristics into the air driven into the waste chamber 326, and having the filter 334 filter the air received from the waste chamber 326 (e.g., the air with which the particles from the odor neutralizer 260 have already interacted). In some implementations, the combined, ordered operation of the odor neutralizer 260 and the filter 334 can cause an overall greater filtration of malodorous particles or other undesirable features of the air from the waste chamber 326 than the individual uses of such components.

For example, the air can be directed (e.g., by operation of the fan 306) from the second base channel 332 through the air filter 334, which can remove particulate matter from the air and/or reduce odor associated with the air. In this sense, the air filter is coupled with the second base channel 332, the second upper housing channel 330 and the lid exhaust 328 to filter remaining odor.

After passing through the air filter 334, the air can be outputted (e.g., released, exhausted, vented) via the air exhaust 336 (e.g., air outlet). According to various implementations, the air exhaust 336 includes one or more openings or perforations in a bottom portion of the base 130 such that air released from the waste management system 100 is released out a bottom portion of the waste management system 100 and not blown upwards towards a user of the waste management system 100.

The air flow path from the first upper housing channel 320 to the waste chamber 326 can define a third flow path. The air flow path between the waste chamber 326 and the second upper housing channel 330 can define a fourth flow path. The first flow path (e.g., defined by the air flow path between the air intake 302 and the first base channel 310) is separated from the third flow path when the upper housing 120 is removed from the base 130. Further, the fourth flow path is separated from a second flow path (e.g., defined by the air flow path from the second base channel 332 to the air exhaust 336) when the upper housing 120 is removed from the base 130.

Figure 4:
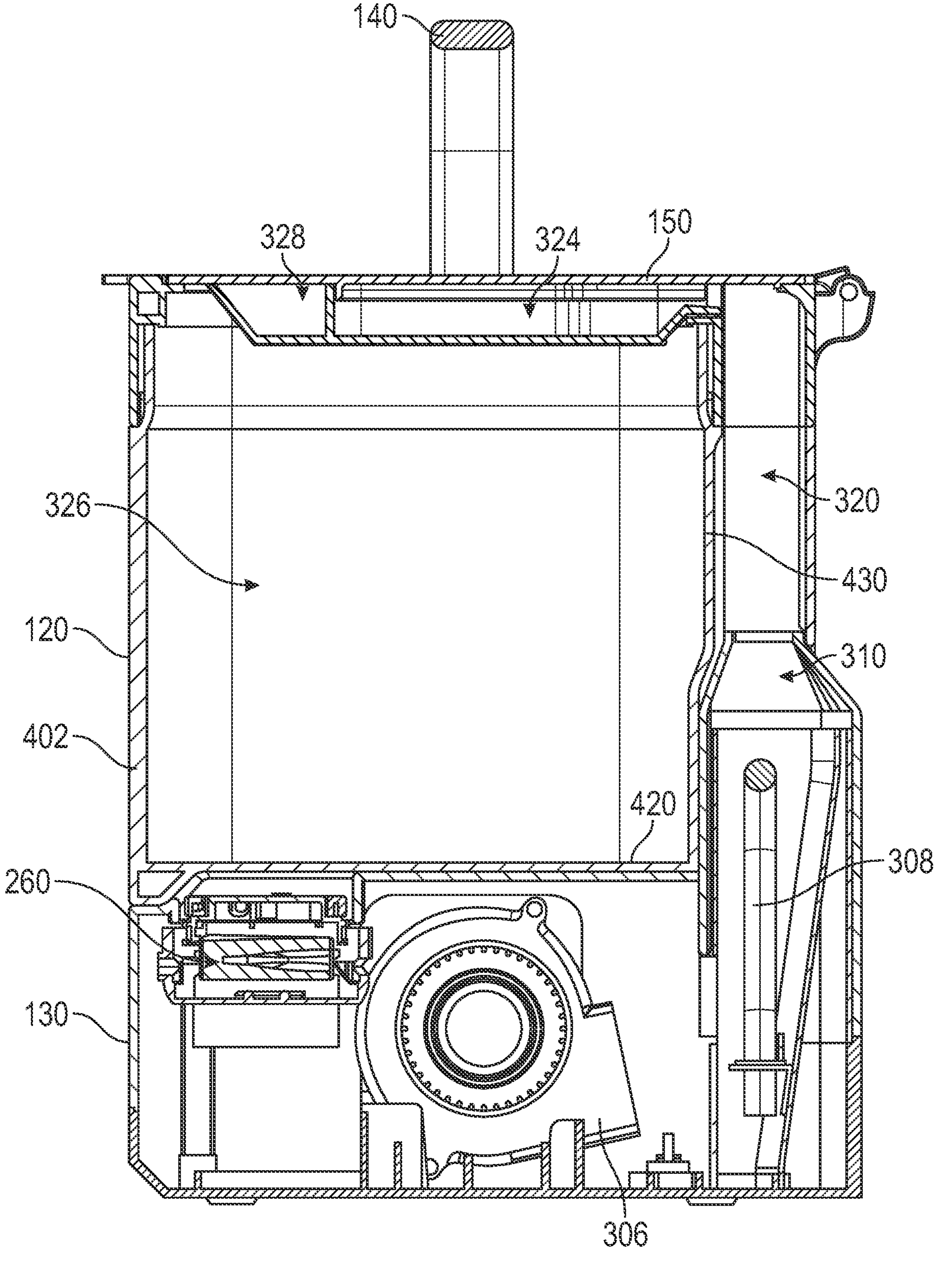
FIG. 4 is a cross-sectional view of the waste management system of FIG. 1.
Figure 5:
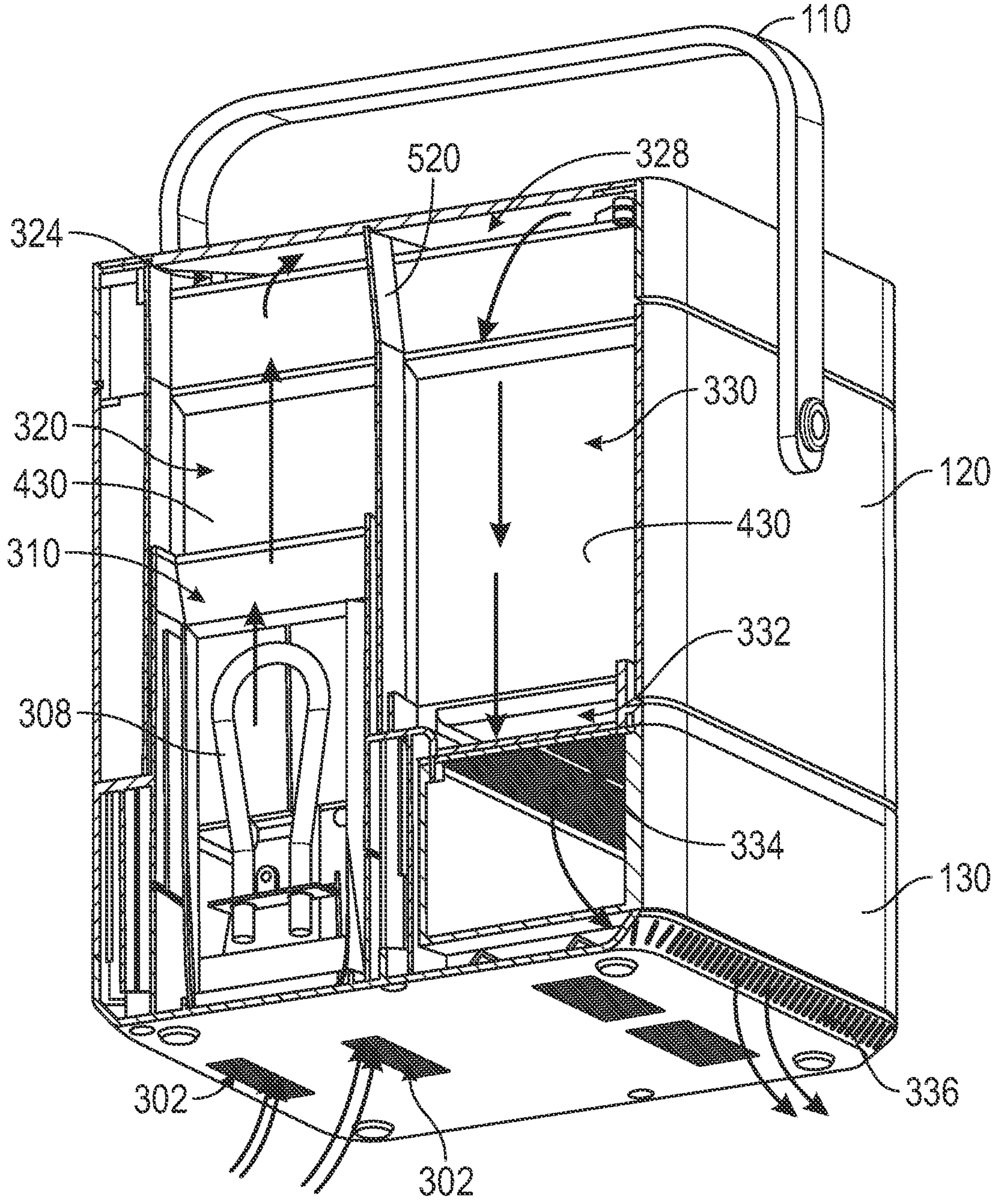
FIG. 5 is another cross-sectional view of the waste management system of FIG. 1.

Referring now to FIGS. 4 and 5, cross-sectional views of the waste management system 100 are shown, according to an example implementation. As shown in FIG. 4, the upper housing 120 can include at least one wall 402 (e.g., outer wall), which can define at least a portion of the waste chamber 326. The wall 402 can be coupled with a wall 420 (e.g., via a base wall 420), which can separate the chamber 326 from at least one of the first upper housing channel 320 or the second upper housing channel 330. Since the waste chamber 326 is not separately defined within the upper housing 120 relative to the outer wall 402, the overall size of the waste management system 100 can be reduced without reducing capacity of the waste chamber 326. Further, since a divider 520 (see FIG. 5) separates the first upper housing channel 320 or the second upper housing channel 330, the input channel into the chamber 326 (e.g., the first upper housing channel 320) intersect with the output channel (e.g., the second upper housing channel 330).

The base wall 420 of the waste chamber 326 can contact an upper surface of the base 130 when the upper housing 120 is coupled to the base 130. chamber As described above and shown in FIGS. 4 and 5, the first upper housing channel 320 and the second upper housing channel 330 are at least partially defined by the wall 420 (e.g., a side wall). The wall 420 that defines at least part of the first upper housing channel 320 and the second upper housing channel 330 can be free of openings.

As shown in FIG. 4, the first base channel 310, including the port 910, can receive air from the heater 308 and direct the air into the first upper housing channel 320 defined by the upper housing 120. A portion of the first base channel 310 extends upwards from the base 130 (e.g., beyond a plane of the an upper 930 depicted in FIG. 9) and can be at least partially received within the first upper housing channel 320 of the upper housing 120, which can reduce the likelihood of the upper housing 120 inadvertently being separated from the base 130.

As shown in FIG. 5, the first base channel 310, the first upper housing channel 320, the second upper housing channel 330, and the second base channel 332 can all be located proximate a side (e.g., rear) portion of the waste management system 100. For example, the lid 150 can rotate about a hinge proximate the rear portion of the waste management system 100. Thus, locating the first upper housing channel 320, the second upper housing channel 330, and the second base channel 332 proximate a rear portion of the waste management system 100, rather than a front portion of the waste management system 100 will not inhibit access to the waste chamber 326. Further, locating the first upper housing channel 320, the second upper housing channel 330, and the second base channel 332 proximate a rear portion of the waste management system 100 can reduce the risk of waste being inadvertently introduced into the first upper housing channel 320, the second upper housing channel 330, and/or the second base channel 332. According to various implementations, the second flow path is defined by and/or includes the air flow path from the second base channel 332 to the air exhaust 336.

Figure 6:
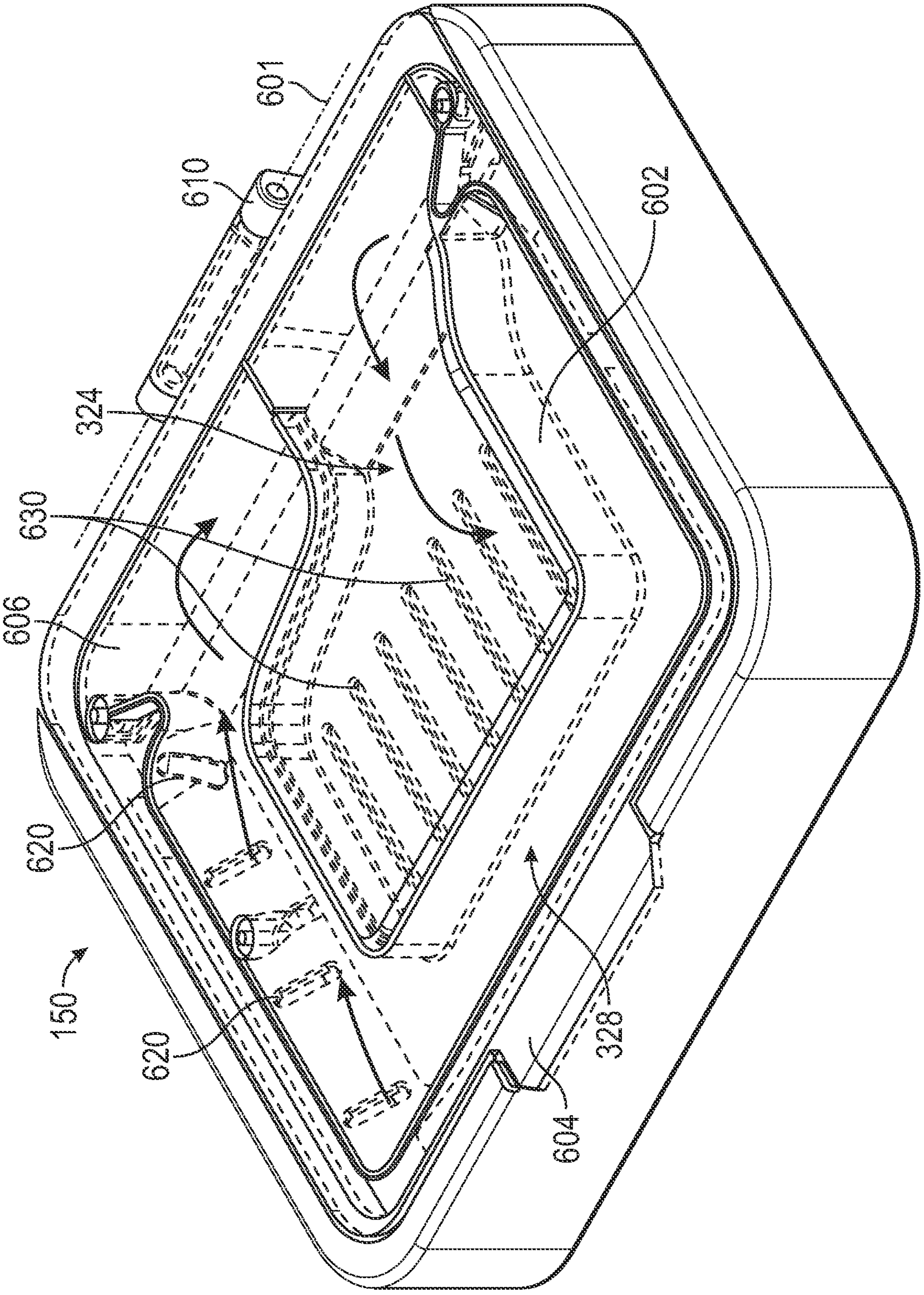
FIG. 6 is a perspective view of a lid of the waste management system of FIG. 1.

Referring now to FIG. 6, a perspective view of the lid 150 is shown. It should be appreciated that FIG. 6 illustrates several internal structures of the lid 150 in dashed lines to provide a better understanding of the lid 150. For example, a plurality of openings (e.g., openings 620 and openings 630) are shown in dashed lines, however, these openings may not be visible while a lid cap 606 is closed (e.g., the lid cap 606 is opaque).

The lid 150 includes a hinge 610 proximate a rear portion (e.g., a portion on the same side of the lid 150 as where the channels 320, 330 of the upper housing 120 are located) of the lid 150. The hinge 610 can allow the lid 150 to rotate about axis 601 relative the upper housing 120 (e.g., between an open orientation and a closed orientation). For example, to access the waste chamber 326, a user can rotate the lid 150 to the open orientation by applying an upwards force on a tab 604 proximate a front portion of the lid 150.

The lid 150 includes the lid inlet 324 to allow air to flow into through a plurality of openings 620 and into the waste chamber 326. The lid includes the lid exhaust 328 to allow air to flow out of the waste chamber 326 through a plurality of openings 630. The lid inlet 324 and the lid exhaust 328 are separated by the wall 602. The wall 602 is coupled to a lid cap 606 that separates the lid inlet 324 and the lid exhaust 328 from the surrounding environment.

According to various implementations, the wall 602 separates the lid inlet 324 from the lid exhaust 328 such that air within the lid inlet 324 does not mix with air within the lid exhaust 328. For example, for air to pass from the lid inlet 324 to the lid exhaust 328, the air can be required to travel through the waste chamber 326. Separating the lid inlet 324 from the lid exhaust 328 can facilitate how airflow is directed through the waste chamber 326 to improve operation of the waste management system 100. Further, separating the lid inlet 324 from the lid exhaust 328 can reduce odors associated with the waste management system 100.

Figure 8:
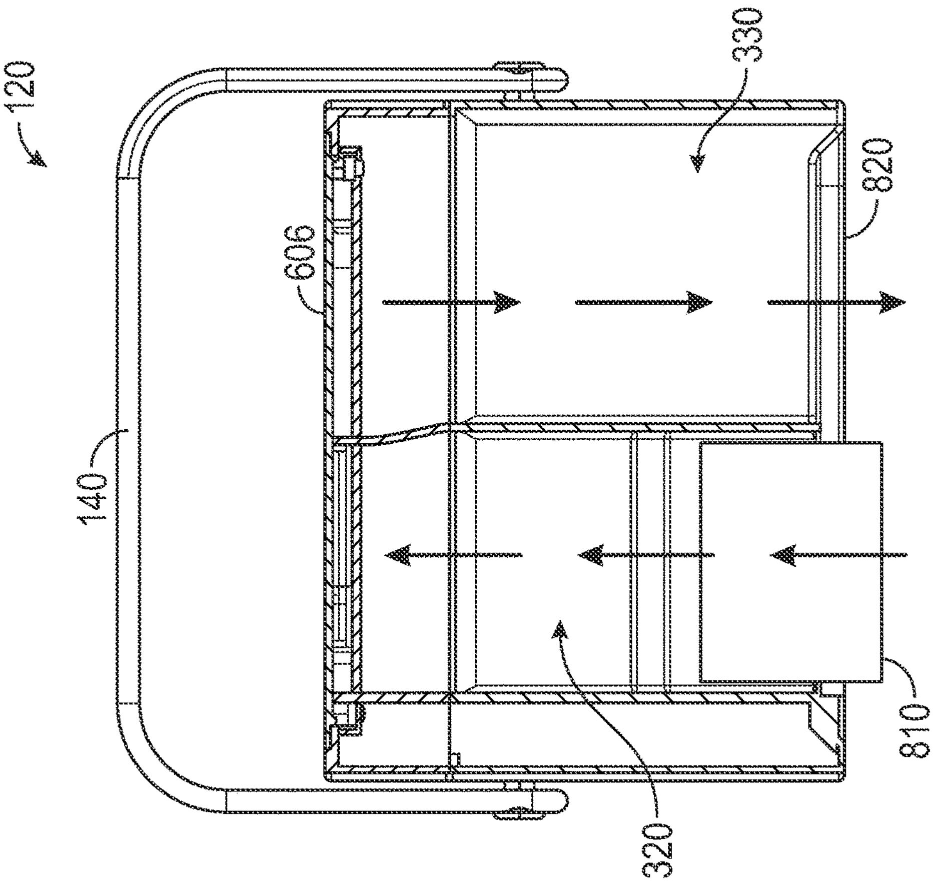
FIG. 8 is another cross-sectional view of the upper housing of FIG. 2.
Figure 7:
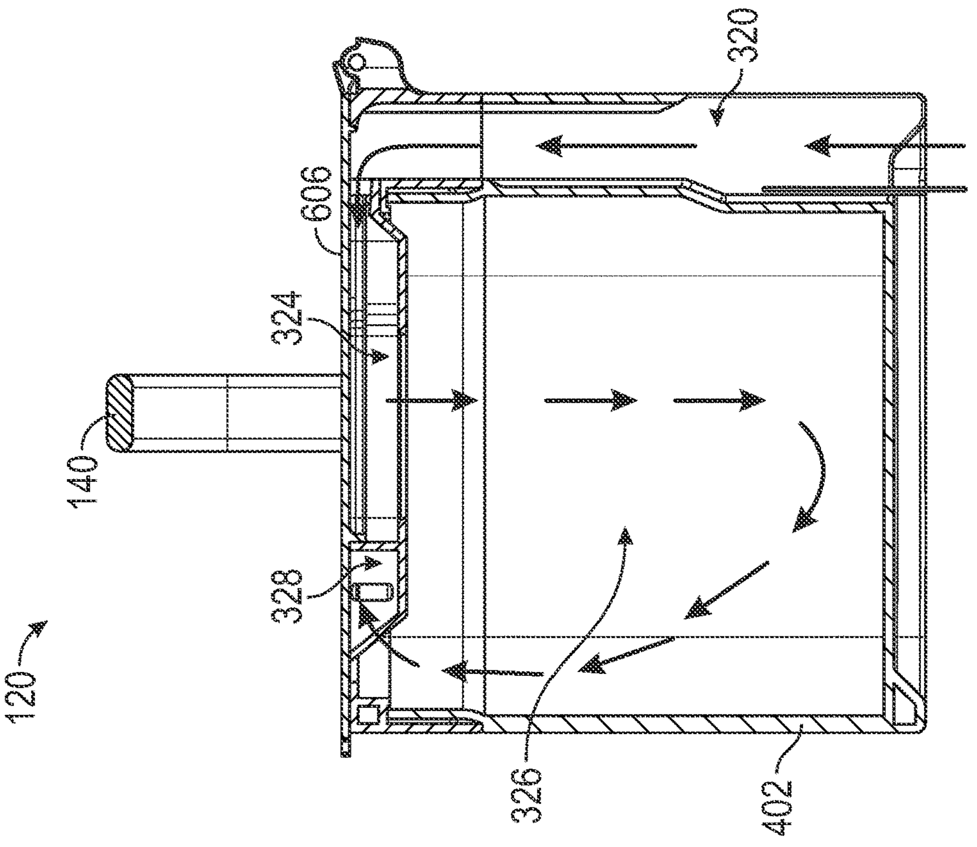
FIG. 7 is a cross-sectional view of the upper housing of FIG. 2.

Referring now to FIGS. 7 and 8, cross-sectional views of the upper housing 120 are shown to illustrate at least a portion of air flow through the upper housing 120 and the corresponding air flow paths of the upper housing 120, according to an example implementation. As shown, the upper housing 120 receives air from the base 130 via the port 810 of the first upper housing channel 320. The air then travels to the lid inlet 324 and into the waste chamber 326. The air flows out of the waste chamber 326 and into the lid exhaust 328. After leaving the lid exhaust 328, the air travels through the second upper housing channel 330 and returns to the base 130 via the port 820. According to various implementations, the first upper housing channel 320 is substantially the only air inlet into the upper housing 120 while the lid 150 is closed. According to various implementations, the second upper housing channel 330 is substantially the only air outlet into the upper housing 120 while the lid 150 is closed.

Figure 9:
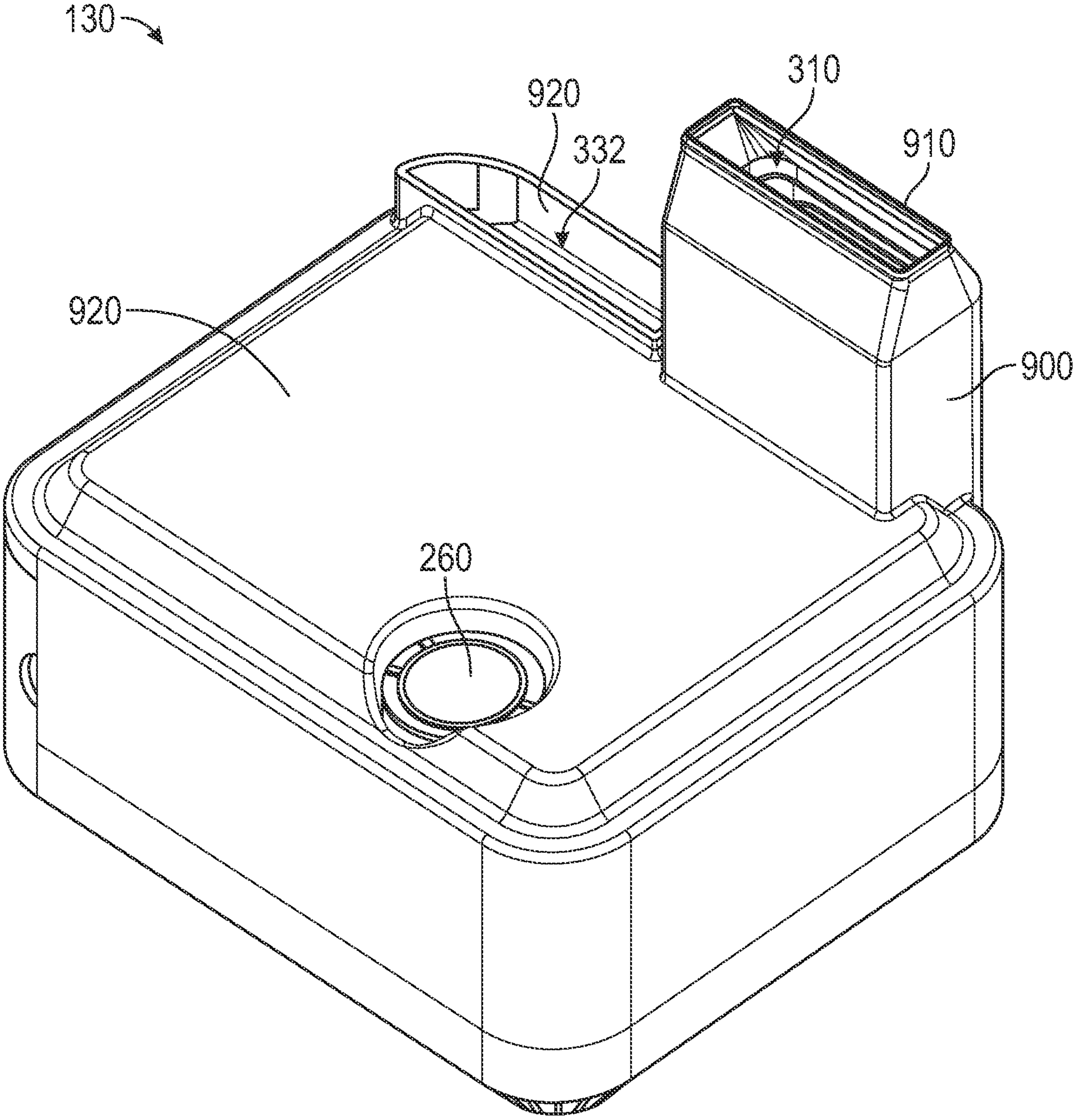
FIG. 9 is a perspective view of the base of FIG. 2.
Figure 10:
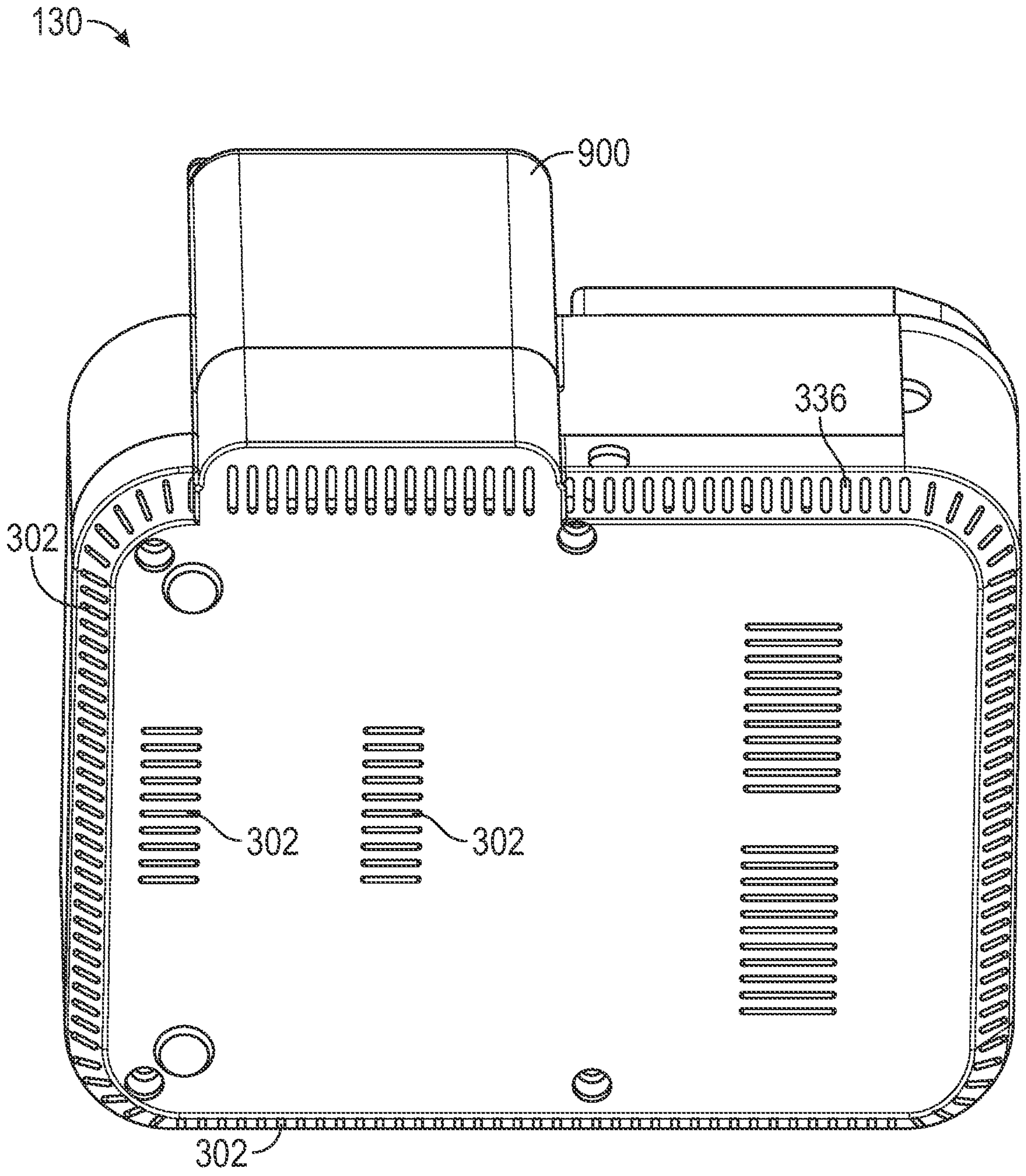
FIG. 10 is another perspective view of the base of FIG. 2.

Referring now to FIGS. 9 and 10, perspective views of the base 300 are shown, according to an example implementation. The base 300 includes the first base channel 310, including the port 910, to provide air to the upper housing 120 and the second base channel 332, including the port 920, to receive air from the upper housing 120. As shown, the second base channel 332 includes a projection 900 to be engage the upper housing 120, such as to be at least partially received within the first upper housing channel 320 (or vice versa), which can reduce the likelihood of the upper housing 120 inadvertently being separated from the base 130. For example, the interaction between the first upper housing channel 320 and the projection 900 can require the upper housing 120 to be lifted upwards away from the base 130 to separate the base 130 from the upper housing 120. Further, the projection 900 can act as a key to ensure the upper housing 120 is properly oriented on top of the base 130. According to various implementations, lifting the upper housing 120 away from the base 130 can cause the first base channel 310 (e.g., the port 910) to decouple or disconnect from the first upper housing channel 320 (e.g., the port 810)

and the second upper housing channel 330 (e.g., the port 920) to decouple or disconnect from the second base channel 332 (e.g., the port 820).

Figure 11:
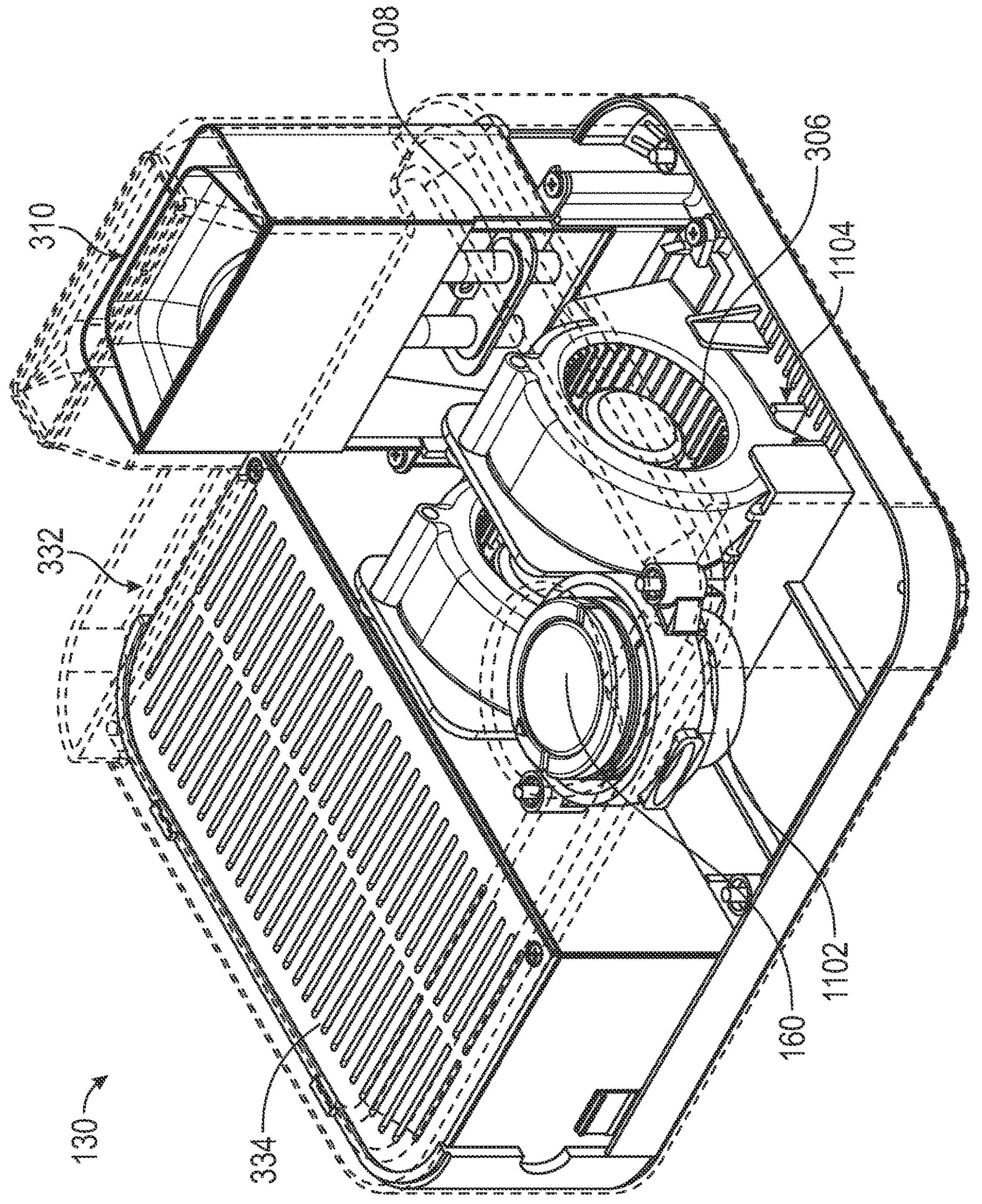
FIG. 11 is another perspective view of the base of FIG. 2.
Figure 12:
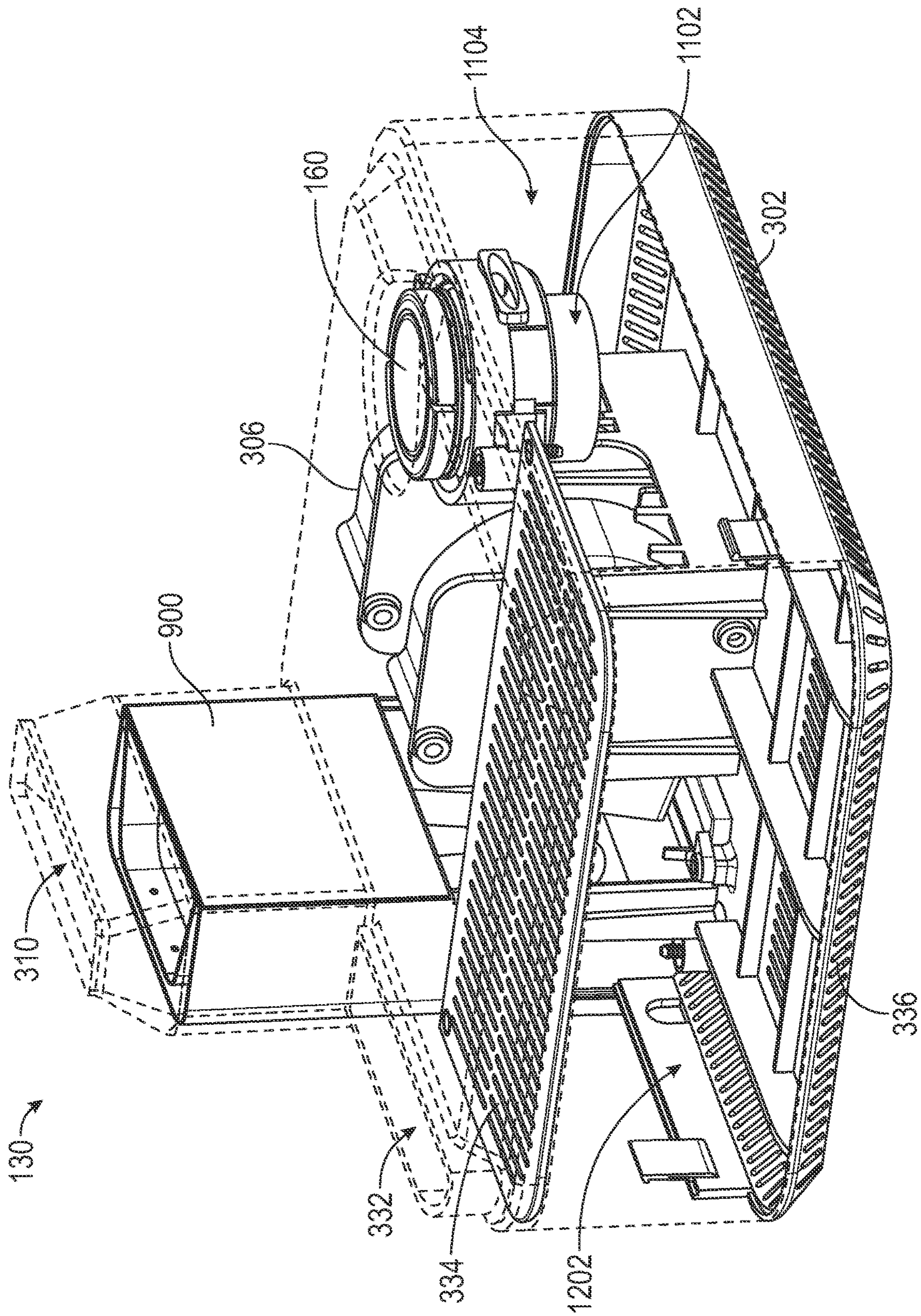
FIG. 12 is another perspective view of the base of FIG. 2.

Referring now to FIGS. 11 and 12, partial perspective views of the base 300 are shown, according to an example implementation. It should be appreciated that one or more exterior surfaces and/or structures of the base 300 are hidden in FIGS. 11 and 12 to provide a better understanding of the internal components of the base 300. The hidden exterior surfaces and/or structures are represented with dashed lines to provide a better understanding of the base 300, such as the various cavities (e.g., cavity 1104, cavity 1202, etc.) at least partially defined by the exterior surfaces and/or structures of the base 300.

The base 300 includes a receiver 1102, which can couple with the odor neutralizer 260, such as to receive the odor neutralizer 260 proximate an upper surface of the base 130. The odor neutralizer 260 extends through the receiver 1102 and into a cavity 1104 defined by the base 130. As the blower assembly 306 blows air into the heater 308, a pressure differential is created within the cavity 1104, thereby drawing air into the cavity 1104. As the air is drawn into the cavity 1104, it can become exposed to the odor neutralizer 260, such as to draw the particles having the at least one of the fragrance characteristic or the odor neutralizing characteristic from the odor neutralizer 260 into the air that the blower assembly 306 directs into the waste chamber 326.

With reference to FIG. 12, the second base channel 332 can receive air from the upper housing 120 to provide the air towards the air filter 334. After passing through the air filter 334 the air is directed into a cavity 1202 in the base 130 and is released via the air exhaust 336.

References herein to the positions of elements (e.g., "top," "bottom," "above," "below") are merely used to describe the orientation of various elements in the FIGURES. The orientation of various elements can differ according to other illustrative implementations, and that such variations are intended to be encompassed by the present disclosure. References herein to the order of elements (e.g., "first," "second," "third," "fourth," "fifth," "sixth," "seventh") are merely used for ease of description relative to each element in the FIGURES.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts, and those elements can be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A device for odor neutralization of food waste, comprising:

a chamber to receive food waste, the chamber having an inlet and an outlet;

an odor neutralizer coupled with the inlet via a first flow path, the odor neutralizer to output particles to mitigate odor emitted from the food waste;

a filter coupled with the outlet via a second flow path to filter remaining odor in the second flow path;

a first housing forming the chamber;

a second housing removably coupled with the first housing; and a lid movably coupled with the first housing to allow access for depositing the food waste in the chamber, wherein the odor neutralizer, the filter, the first flow path, and the second flow path are in the second housing, wherein the first flow path is separated from the second flow path, and wherein the inlet and the outlet are formed in the lid.

2. The device of claim 1, further comprising a fan arranged along the first flow path between the odor neutralizer and the inlet, the fan to draw air over the odor neutralizer through the first flow path into the chamber and to drive the air through the chamber out of the outlet to the filter.

3. The device of claim 1, wherein the odor neutralizer releases one or more particles into air flowing over or through the odor neutralizer, the one or more particles having at least one of a fragrance characteristic or an odor neutralizing characteristic.

4. The device of claim 1, wherein the filter is a carbon filter.

5. The device of claim 1, wherein the first housing is above the second housing in a use mode of the device.

* * * * *